United States Patent
Baldauf et al.

(10) Patent No.: US 8,623,240 B2
(45) Date of Patent: Jan. 7, 2014

(54) METHOD AND APPARATUS FOR CONVERTING CARBON MONOXIDE AND WATER INTO CARBON DIOXIDE AND HYDROGEN, WITH REMOVAL OF ONE OR MORE PRODUCTS

(75) Inventors: Manfred Baldauf, Erlangen (DE); Carsten Graeber, Erlangen (DE); Marc Hanebuth, Hamburg (DE); Gerhard Zimmermann, Höchstadt/Aisch (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 13/387,170

(22) PCT Filed: Jun. 25, 2010

(86) PCT No.: PCT/EP2010/059094
§ 371 (c)(1), (2), (4) Date: Jan. 26, 2012

(87) PCT Pub. No.: WO2011/012385
PCT Pub. Date: Feb. 3, 2011

(65) Prior Publication Data
US 2012/0126178 A1 May 24, 2012

(30) Foreign Application Priority Data
Jul. 30, 2009 (DE) .......... 10 2009 035 388

(51) Int. Cl.
*C01B 3/38* (2006.01)
*C01B 3/24* (2006.01)

(52) U.S. Cl.
USPC .......... 252/373; 423/650

(58) Field of Classification Search
USPC .......... 423/650
See application file for complete search history.

(56) References Cited

U.S. PATENT DOCUMENTS

| | | | | |
|---|---|---|---|---|
| 3,262,973 | A | * | 7/1966 | Swakon .......... 562/609 |
| 3,772,380 | A | | 11/1973 | Hershman |
| 4,087,373 | A | * | 5/1978 | Reed, Jr. .......... 252/373 |
| 4,137,298 | A | | 1/1979 | Gorin |
| 4,145,405 | A | | 3/1979 | Gorin |
| 4,372,833 | A | | 2/1983 | King, Jr. |
| 2004/0028603 | A1 | | 2/2004 | Mays |

FOREIGN PATENT DOCUMENTS

| | | |
|---|---|---|
| EP | 0299995 B1 | 10/1991 |
| WO | WO 8805422 A1 | 7/1988 |
| WO | WO 2006098854 A2 | 9/2006 |

\* cited by examiner

*Primary Examiner* — Melvin C Mayes
*Assistant Examiner* — Kenneth Vaden

(57) ABSTRACT

A method for converting carbon monoxide and water into carbon dioxide and hydrogen, with simultaneous removal of one or more products, is described. The method includes the following steps: in a first reactor, carbon monoxide from the gas phase is bound in a first solvent and converted into formate, in a third reactor, formate is decomposed and resultant hydrogen $H_2$ is removed, and in a second reactor a solid which is a hydrogen-carbonate salt or a carbonate salt is removed. The thermal decomposition of the solid and the expulsion of the carbon dioxide are carried out in an additional fourth reactor, optionally in a second solvent. Further presented is an apparatus for converting carbon monoxide and water into carbon dioxide and hydrogen, including a fourth reactor which thermally decomposes solids formed in the course of the reaction, and gives off carbon dioxide.

12 Claims, 2 Drawing Sheets

CO SHIFT REACTION

METHOD AND APPARATUS FOR CONVERTING CARBON MONOXIDE AND WATER INTO CARBON DIOXIDE AND HYDROGEN, WITH REMOVAL OF ONE OR MORE PRODUCTS

CROSS REFERENCE TO RELATED APPLICATIONS

This application is the US National Stage of International Application No. PCT/EP2010/059094, filed Jun. 25, 2010 and claims the benefit thereof. The International Application claims the benefits of German application No. 10 2009 035 388.7 DE filed Jul. 30, 2009. All of the applications are incorporated by reference herein in their entirety.

FIELD OF INVENTION

The invention relates generally to the carbon monoxide shift reaction $CO+H_2O \rightarrow CO_2+H_2$. The industrial utilization of this reaction is addressed.

BACKGROUND OF INVENTION

The carbon monoxide shift reaction is among the most important reactions of the chemical industry. Recently, this chemical reaction has also become important for power stations using fossil fuels. The background to this is the current trend towards low-carbon dioxide power generation in power stations burning fossil fuels. Here, the carbon monoxide shift reaction can be combined with simultaneous removal of the carbon dioxide formed. According to the present-day prior art, three fundamental approaches are possible: precombustion, post-combustion and oxyfuel.

In the precombustion $CO_2$ capture approach, the carbon monoxide has to be converted into carbon dioxide according to the chemical equation of the carbon monoxide shift reaction before the combustion in order to be able to remove the total carbon in the form of carbon dioxide. Here, the major part of the energy of the carbon monoxide is transferred "shifted" to hydrogen which can be used in a gas turbine.

A disadvantage here is that removal of the two products hydrogen and carbon dioxide in the gas phase is energy-intensive.

A combination frequently proposed in the prior art is the precombustion approach with removal of carbon dioxide combined with the carbon monoxide shift reaction in the gas phase. Here, a synthesis gas is "shifted" in admixture with steam over catalysts at temperatures in the range 300-500° C.

The carbon dioxide is subsequently separated off by means of a physical gas scrub, for example a Rectisol scrub, in a second subprocess. Here, the carbon dioxide is absorbed in cooled methanol at about −40° C. Since these low temperatures are necessary to be able to separate off the carbon dioxide to a sufficient extent, a great amount of energy has to be expended for cooling and this reduces the overall efficiency of the power station.

The European patent EP 0 299 995 B1 discloses a process for converting carbon monoxide and water into carbon dioxide and hydrogen. The combination of a carbon monoxide shift reaction with simultaneous removal of the carbon dioxide formed from the combustion gases described therein is realized in the liquid phase. Particular mention may be made here of example No. 6 and also FIG. 2 of the patent text. In this process, water-containing methanol having a water content of about 2% is used as solvent, with the pH thereof being increased by addition of a carbonate such as potassium carbonate. The chemical reactions, which can in each case proceed physically separately, are as follows:

$$CO + CO_3^{2-} + H_2O \rightarrow HCOO^- + HCO_3^- \quad (1)$$

$$2HCO_3^- \rightarrow CO_2 + CO_3^{2-} + H_2O \quad (2)$$

$$HCOO^- + H_2O \rightarrow HCO_3^- + H_2 \quad (3)$$

In the first step corresponding to equation (1), carbon monoxide is bound from the gas phase in a solution and separated from the accompanying components of the synthesis gas. Thermal decomposition of the dissolved hydrogencarbonate $HCO_3^-$ formed according to equations (1) and (3) is subsequently carried out by increasing the temperature to at least 150° C., with carbon dioxide being formed and preferably being completely removed. The reactions corresponding to equations (1), (2) and (3) in each case take place with the same numbering in a reactor. As last step, the formate $HCOO^-$ formed according to equation (1) is decomposed according to the equation (3) and hydrogen is formed. Hydrogen formed according to equation (3) is discharged from the process physically separately from carbon dioxide in a further step.

It has been found that the process corresponding to the patent EP 0 299 995 B1 is not satisfactory for the present use.

Thus, for example, the carbon dioxide cannot be separated off sufficiently in a second reactor. Carbon dioxide is instead discharged with part of the hydrogen and of the residual gases. Furthermore, a large proportion of the solvent methanol is lost with the driving-off of the carbon dioxide in the second reactor. This has to be recovered, for example by means of a water scrub with subsequent distillation. However, this requires increased outlays in terms of process engineering and energy.

The lost hydrogen which is entrained in the carbon dioxide stream in the process and is not separated off amounts to about 8%. These losses lead to very uneconomical operation of the power station with carbon dioxide removal by this process.

Based on the equations (1) and (3), a relatively low yield is therefore achieved in the carbon dioxide removal or the isolation of hydrogen since both gases are not separated off in sufficient purity but partly appear at the outlet for the respective other gas.

SUMMARY OF INVENTION

The problem addressed by the invention is to provide a process and an apparatus for carrying out the carbon monoxide shift reaction with improved efficiency.

Advantageous embodiments may be found in the description that provide particular advantages for the processes and the apparatuses described herein.

The invention is based on the recognition that the thermal decomposition of hydrogencarbonate $HCO_3^-$ or of carbonate $CO_3^{2-}$ and the driving-off of carbon dioxide $CO_2$ cannot be carried out to completion in the methanolic solution of the second reactor since this solution also contains other dissolved gases. This applies in particular to hydrogen from the synthesis gas or hydrogen residues which could not be desorbed in the decomposition of formate. These gases lead to dilution of the carbon dioxide and on the hydrogen side to a loss of fuel.

According to the invention, the reaction conditions are set so that either a hydrogencarbonate or a carbonate is precipitated in solid form in a precipitation reactor. A solid can be separated off from the reaction mixture and can subsequently be decomposed to drive off carbon dioxide in an additional fourth reactor. The carbon monoxide shift reaction is carried out in the liquid phase. The formation of the two gases hydrogen and carbon dioxide proceeds in different places, so that they can consequently be produced separately from one another. The energy consumption of such a process is lower than that of a carbon monoxide shift reaction in the gas phase with subsequent separation of hydrogen and carbon dioxide.

If the decomposition of the solid, viz. a hydrogencarbonate or a carbonate, does not occur readily, the solid can be dissolved beforehand in a solvent which ideally has a high boiling point compared to water in order to prevent high solvent losses.

A preferred precipitation of the hydrogencarbonate can, for example, advantageously be brought about by decreasing the temperature in the precipitation reactor.

The use of a saturated hydrogencarbonate solution leads to hydrogencarbonate formed in the first reactor and in the third reactor not being able to be dissolved and thus precipitating spontaneously.

Furthermore, the precipitation can be carried out by addition of a nonpolar second solvent which is not miscible with the first solvent, with the second solvent serving as precipitate for salts. After the precipitation, such additions can be distilled off again.

A further advantageous possibility for precipitating the hydrogencarbonate is addition of a readily soluble salt having the same cation as that present in the hydrogencarbonate. As a result, the solubility product of the hydrogencarbonate salt is reached at a relatively low hydrogencarbonate concentration.

Furthermore, it is particularly advantageous to recirculate the carbonate or solid metal oxide formed from the fourth reactor for the thermal decomposition of the hydrogencarbonate or the carbonate to the first reactor. This closes a carbonate circuit or a materials circuit.

BRIEF DESCRIPTION OF THE DRAWINGS

The invention is described below by nonlimiting examples with the aid of schematic figures.

In the figures.

DETAILED DESCRIPTION OF INVENTION

Figure 3:
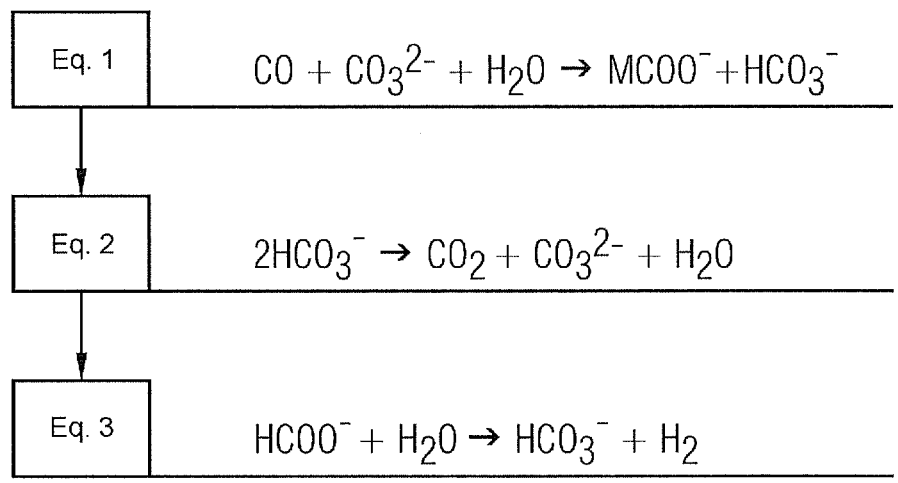
FIG. 3 shows a list of the equations (1), (2) and (3) which together represent the carbon monoxide shift reaction as is known in the prior art.

FIG. 3 indicates further reaction equations based on the reactions according to equations (1), (2) and (3) to show how the carbon monoxide shift reaction proceeds in a first reactor, second reactor and third reactor. According to the total system of equations, formate formation with simultaneous formation of hydrogencarbonate occurs. According to equation (3), formate reacts with water to form hydrogencarbonate and hydrogen. According to equation (2), hydrogencarbonate is decomposed with liberation of carbon dioxide at another place in the process.

Since formate salts can in principle also precipitate in the first reactor 1, depending on the prevailing conditions, a change in the reaction sequence is advantageous. In a first variant, the following reactions occur.

$$\text{1st reactor } CO + CO_3^{2-} + H_2O \rightarrow HCOO^- + HCO_3^- \quad (1.1) = (1)$$

$$\text{3rd reactor } HCOO^- + H_2O \rightarrow HCO_3^- + H_2 \quad (3.1)$$

$$\text{2nd reactor } M^+ + HCO_3^- \rightarrow MHCO_3 \text{ (solid)} \quad (2.1)$$

$$\text{4th reactor } 2MHCO_3(\text{solid}) \rightarrow CO_2 + M_2CO_3(\text{solid}) + H_2O \quad (4.1)$$

The reaction equations 2.1 and 4.1 are formulated by way of example for the use of alkali metal ions. Other cations can equally well be suitable for carrying out the reactions, in which case the reaction equations 2.1 and 4.1 then change accordingly.

Solvent and constituents dissolved therein from the second reactor 2 and nongaseous components from the fourth reactor 4 can be recirculated to the first reactor 1.

In the additional fourth reactor 4 which has been introduced according to the invention, the precipitate from the second reactor 2 is, after optional drying, subjected to a thermal decomposition according to equation 4.1. The carbonate $M_2CO_3$ is introduced together with the water into the recirculated stream from the second reactor 2 to the first reactor 1, thus closing the carbonate circuit. The process presented can also be carried out analogously using other cations, for example the ammonium ion or alkaline earth metal ions.

A further modification of the process provides for a strongly alkaline solution of hydroxides to be used instead of a weakly alkaline carbonate buffer system. The subreactions again change as a result and according to a second variant are as follows:

$$\text{1st reactor } CO + OH^- + HCOO^- \quad (1.2)$$

$$\text{3rd reactor } HCOO^- + OH^- \rightarrow CO_3^{2-} + H_2 \quad (3.2)$$

$$\text{2nd reactor } 2M^+ + CO_3^{2-} \rightarrow M_2CO_3 \text{ (solid)} \quad (2.2)$$

$$\text{4th reactor } M_2CO_3(\text{solid}) \rightarrow CO_2 + M_2O(\text{solid}) \quad (4.2)$$

The reaction equations 2.2 and 4.2 are not to be interpreted as being restricted to a particular alkali metal (M). Other cations may equally well be suitable for carrying out the reactions; the reaction equations then change accordingly.

In the second variant corresponding to the reaction equations (1.2), (3.2), (2.2) and (4.2), a thermal decomposition of the carbonate $M_2CO_3$ after drying of the precipitate from the second reactor 2 is carried out in the additional fourth reactor 4.

The oxide $M_2O$ is introduced into the recirculated stream from the second reactor 2 to the first reactor 1. There, it reacts with water to form the hydroxide, thus closing the materials circuit. The corresponding equation is:

$$M_2O + H_2O \rightarrow 2MOH \quad (5.2)$$

The reaction system according to the second variant has the advantage that the equilibrium concentration of carbon dioxide $CO_2$ in the solvent after the first reactor 1 will be significantly lower than when the first variant according to the equations (1.1), (3.1), (2.1), (4.1) is used. This very strongly suppresses the undesirable desorption of carbon dioxide together with the hydrogen $H_2$ formed in the third reactor 3 and thus reduces the losses of carbon dioxide with or in the hydrogen stream.

As solvent, it is possible to use aqueous methanol, water or a polar solvent. A condition is that the participating salts are soluble.

According to the invention, the decomposition of the hydrogencarbonate or the carbonate is not carried out in a solution which is circulated by pumping and also contains dissolved fuel gases but instead after precipitation of a solid. The solid is, according to variant 1, the hydrogencarbonate and according to variant 2 the carbonate. The decomposition of the solid is accordingly carried out in a separate reactor. These measures enable both losses of solvent and losses of fuel gas to be avoided.

In addition, the pH range can be increased in a further step and the carbon dioxide equilibrium concentration in the solution can thus be significantly reduced and undesirable carbon dioxide desorption by means of the residue gases in the first reactor 1 or by means of the hydrogen in the third reactor 3 can at the same time be reduced. This increases the overall degree of removal of carbon dioxide and the losses of fuel gas decrease.

Figure 1:
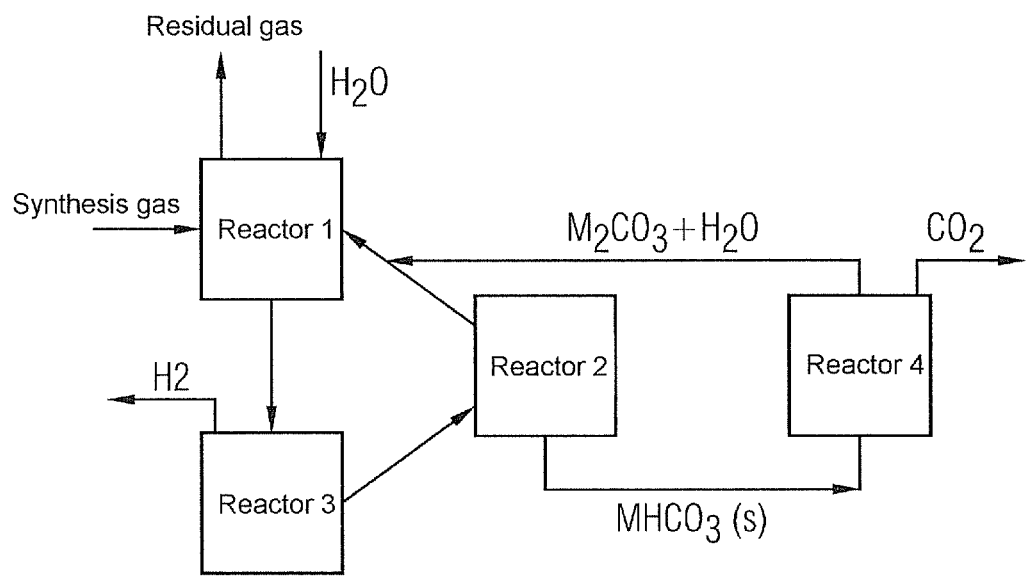
FIG. 1 shows an arrangement of four reactors, where a solid hydrogencarbonate is separated off in the second reactor and is
thermally decomposed with liberation of carbon dioxide in the fourth reactor.

FIG. 1 shows the first variant which produces a hydrogencarbonate as solid in the second reactor 2 and thermally decomposes this in the fourth reactor 4 with liberation of carbon dioxide.

Figure 2:
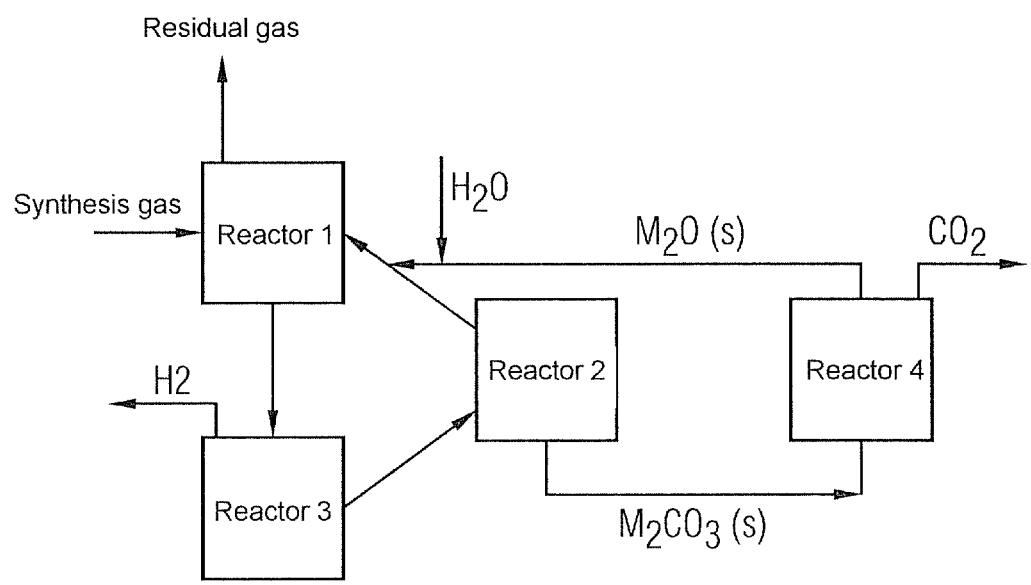
FIG. 2 shows an arrangement of four reactors corresponding to FIG. 1, where a carbonate is separated off as solid in the second reactor and is decomposed in the fourth reactor, likewise with liberation of carbon dioxide.

FIG. 2 shows a scheme corresponding to the second variant, in which the solid is a carbonate instead of the hydrogencarbonate. Both in FIG. 1 and in FIG. 2, it can clearly be seen that the fuel gas hydrogen and the carbon dioxide to be separated off before combustion are removed at significantly different places in the process.

The invention claimed is:

1. A process for converting carbon monoxide and water into carbon dioxide and hydrogen, comprising:
    forming formate as carbon monoxide is bound from a gas phase in a first solvent in a first reactor; and
    decomposing the formate in a third reactor and the hydrogen formed is separated off,
    wherein either a solid hydrogencarbonate formed or a solid carbonate formed is in each case precipitated and separated off in a second reactor, and
    wherein the solid hydrogencarbonate or the solid carbonate is thermally decomposed and the carbon dioxide is separated off therefrom a fourth reactor.

2. The process as claimed in claim 1,
    wherein carbon monoxide is bound from the gas phase in a first solvent which is alkaline in the first reactor.

3. The process as claimed in claim 1, wherein the separating-off of the carbon dioxide is carried out in a second solvent which is different from the first solvent.

4. The process as claimed in claim 3, wherein the second solvent does not comprise any methanol.

5. The process as claimed in claim 1, wherein the thermal decomposition of hydrogencarbonate is preceded by dissolution in a solvent having a higher boiling point than water in order to avoid high losses of solvent.

6. The process as claimed in claim 1, wherein a solid hydrogencarbonate formed is precipitated and separated off in the second reactor, and wherein the precipitation of the hydrogencarbonate is effected by decreasing the temperature.

7. The process as claimed in claim 1, wherein a solid hydrogencarbonate formed is precipitated and separated off in the second reactor, and wherein a saturated hydrogencarbonate solution is used so that hydrogencarbonate formed in the first reactor cannot be dissolved and precipitates.

8. The process as claimed in claim 1, wherein salts are precipitated by addition of a nonpolar solvent which is miscible with the first solvent.

9. The process as claimed in claim 1, wherein a readily soluble salt having the same cation as that in the hydrogencarbonate is added so that the solubility product of the hydrogencarbonate salt is reached even at low hydrogencarbonate concentrations.

10. The process as claimed in claim 1, wherein a solid formed in the fourth reactor is recirculated together with water from the fourth reactor to the first reactor.

11. The process as claimed in claim 1, wherein an alkaline solution of hydroxides is used so that the subreactions in the individual reactors are as follows:

$$1\text{st reactor } CO+OH^- \rightarrow HCOO^-,$$

$$2\text{nd reactor } HCOO^-+OH^- \rightarrow CO_3^{2-}+H_2,$$

$$3\text{rd reactor } 2M^++CO_3^{2-} \rightarrow M_2CO_3(\text{solid}),$$

$$4^{th} \text{ reactor } M_2CO_3(\text{solid}) \rightarrow CO_2+M_2O(\text{solid}),$$

where M is any monovalent or polyvalent cation.

12. The process as claimed in claim 11, wherein the oxide $M_2O$ is introduced into the recirculated stream from the fourth reactor to the first reactor and reacts to form a hydroxide so that the equilibrium concentration of carbon dioxide in the solvent downstream of the first reactor is decreased.

\* \* \* \* \*